(12) United States Patent
Lu et al.

(10) Patent No.: US 6,629,450 B2
(45) Date of Patent: Oct. 7, 2003

(54) SEMICONDUCTOR AUTO LEAK RATE TESTER

(75) Inventors: Hsueh-Chin Lu, Hsinchu (TW); Min-Je Chiang, Miaoli (TW); Chen-Hsiang Hsieh, Hsinchu (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 0 days.

(21) Appl. No.: 09/904,800

(22) Filed: Jul. 13, 2001

(65) Prior Publication Data

US 2003/0010092 A1 Jan. 16, 2003

(51) Int. Cl.⁷ .......................... G01M 3/04; G01F 17/00
(52) U.S. Cl. ............................................ 73/40; 702/51
(58) Field of Search .................... 73/40, 41.4, 45.1, 73/45.2, 45.4; 702/51

(56) References Cited

U.S. PATENT DOCUMENTS

| | | | |
|---|---|---|---|
| 4,587,619 A | * 5/1986 | Converse, III et al. | ....... 702/51 |
| 6,307,390 B1 | * 10/2001 | Akaike et al. | .............. 324/758 |
| 6,317,647 B1 | * 11/2001 | Akaike et al. | .............. 700/213 |

FOREIGN PATENT DOCUMENTS

| | | | | |
|---|---|---|---|---|
| EP | 0177119 | * | 4/1986 | ............. A61L/2/24 |
| EP | 674166 | * | 9/1995 | ............ G01M/3/28 |

* cited by examiner

*Primary Examiner*—Helen Kwok
*Assistant Examiner*—Jay L Politzer
(74) *Attorney, Agent, or Firm*—Tung & Associates (57) ABSTRACT

A method for automatically conducting a leak test for a vacuum system includes receiving a process status input representing the completion of a manufacturing cycle. On determining that the process status is in a complete state, the vacuum system isolation valve is closed. In one embodiment, the first pressure input is measured at the beginning of the leak test and compared to a second pressure input measured at the expiration of timer. If the difference between the first and second pressure measurements are greater than the configurable threshold pressure, then the vacuum system is determined to be leaky. In another embodiment, the vacuum system is determined to be leaky if at least one of a series of pressure measurements exceeds the threshold pressure value. In response to the determination of the leak, an interlock signal to disable the operation of the vacuum system is activated.

20 Claims, 5 Drawing Sheets

SEMICONDUCTOR AUTO LEAK RATE TESTER

FIELD OF THE INVENTION

The present invention relates to the field of semiconductor manufacturing, and more particularly to a system and method for automatically conducting a leak test for a vacuum system used in the manufacturing of semiconductor devices.

BACKGROUND OF THE INVENTION

The use of vacuum systems in the manufacture of semiconductor devices is well known in the semiconductor industry. Vacuum systems play a critical role in semiconductor processes such as deposition, etching and ion implantation. The integrity of vacuum systems used in semiconductor processing systems is critical to device yields. For example, in deposition systems, partial pressures of air constituents such as oxygen can reduce the adherence and alter the electrical properties of deposited films. In etching systems, air leaks can affect the basic process chemistry and prematurely erode the photoresist overlay. Deposition and etching systems are typically pumped to some low base pressure prior to introduction of the process gases to minimize the background air contamination. Ion implantation method has been used for placing impurity, or doping, ions in a semiconductor material such as a silicon substrate at precisely controlled depths and at accurately controlled dopant concentrations. Since the wafer surface cannot be contaminated other than by the intended impurity ions, no contamination in the ion implanter components can be tolerated.

Semiconductor devices are typically manufactured by the use of advanced machines for various processes such as deposition, etching and ion implantation. The vacuum systems are often a critical part of these advanced machines. The machines typically go through a manufacturing cycle to produce a batch of the semi-finished or finished semiconductor device. The manufacturing cycle typically includes a plurality of phases such as a set-up phase, a start phase, one or more operational phases, a shutdown phase and an end phase. On completion of the end phase, which indicates a completion of the manufacturing cycle, the semi-finished or finished semiconductor device may be passed on to the next-in-sequence machine for further processing. The machines typically wait in an idle state between the end of one manufacturing cycle and the start of the next manufacturing cycle. The duration of the idle state may vary from a few minutes to several hours depending on the manufacturing volume.

Predictability, reliability, repeatability and cost are critical in an application such as this, where a leak in a vacuum system may result in the stoppage of a production line. The production loss and the subsequent rework may cost millions of dollars in lost profits. The following U.S. patents, which describe various vacuum system leak detection apparatus and methods, are hereby incorporated herein by reference: Chamber Effluent Monitoring System and Semiconductor Processing System Comprising Absorption Spectroscopy Measurement System and Methods of Use (U.S. Pat. No. 6,154,284), and Leakage Detection Apparatus Equipped With Universal Adapter Head and Method of Testing (U.S. Pat. No. 5,777,209).

Conducting leak tests to preserve the integrity of the vacuum systems is highly desirable. Presently, the machines often deploy sophisticated and expensive instruments such as mass spectrometers to monitor the integrity of vacuum systems during the manufacturing cycle. However, many of these instruments are designed to detect particulate matter and often do not conduct leak tests for the vacuum systems during the idle cycle. It would be preferable to automatically conduct the leak tests on a frequent or periodic basis and document the results. It would be desirable to identify a machine equipped with a leaky vacuum system and prevent its further use until the vacuum system has been repaired.

SUMMARY OF THE INVENTION

The problems outlined above are addressed by a system and method for automatically conducting a leak test for a vacuum system used in the manufacturing of semiconductor devices, as described herein.

In one embodiment, the method for automatically conducting a leak test for a vacuum system, includes receiving a process status input representing the completion or non-completion of a manufacturing cycle. On determining that the process status is in a completed state, the vacuum system is isolated from the atmosphere by closing the isolation valve. In one embodiment, the first pressure input received represents the initial pressure measured at the beginning of the leak test. At the expiration of a timer, a second pressure input is received and compared to the first pressure input. If the difference between the second pressure and the first pressure is greater than a configurable threshold pressure then the vacuum system is determined to be leaky. In another embodiment, a series of pressure measurements are collected during the leak test duration. If at least one of the pressure measurements included in the series of pressure measurements collected exceeds a threshold pressure value then the vacuum system is determined to be leaky. In response to the determination of the vacuum system leak, an interlock signal to disable the operation of the vacuum system is activated.

The system to implement the method includes a first circuit section, a second circuit section and a third circuit section. The first circuit section is configurable to receive a first signal representing status of the set point for the output power and a second signal representing the output power of the power supply system. The first circuit section is configurable to receive a process status signal and generate a first output signal to close an isolation valve. The second circuit section, which is electrically coupled to the first circuit section, is configurable to activate a timer in response to receiving the first output signal. The third circuit section, which is electrically coupled to the first and second circuit sections, is configurable to receive a pressure input signal representing the pressure inside the main processing chamber. The third circuit section is configurable to compare the pressure input signal to a threshold pressure value and determine the vacuum system is leaky if the value of the pressure input signal is greater than the value of the threshold pressure.

In another embodiment, a processor executes program instructions stored in memory to implement at least some aspects of the system or method. According to this embodiment, the system includes a processing unit, memory coupled to the processing unit and a program included in the memory. The program is executable by the processor to implement conducting a leak test for a vacuum system.

BRIEF DESCRIPTION OF THE DRAWINGS

Novel features believed characteristic of the invention are set forth in the appended claims. The invention itself, however, as well as a preferred mode of use, various objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

While the invention is susceptible to various modifications and alternative forms, specific embodiments thereof are shown by way of example in the drawings and will be described herein in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

Elements, which appear in more than one FIG., herein, are numbered alike in the various FIGS.

Figure 1:
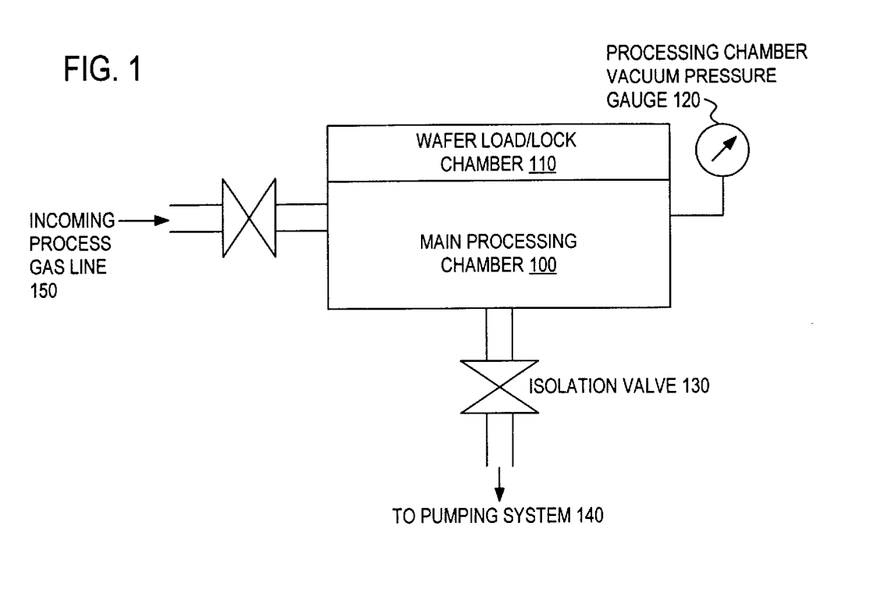
FIG. 1 is a functional diagram illustrating a process chamber utilizing a vacuum for manufacturing semiconductor devices.

FIG. 1 illustrates a process chamber, utilizing a vacuum system, used to manufacture semiconductor devices. The process chamber is typically included as a part of a machine used in the manufacturing process. The main processing chamber 100 may include a wafer load/lock chamber 110. During the start of a manufacturing cycle a wafer is placed inside the load/lock chamber 110. On placing the wafer inside the load/lock chamber 110, the door to the chamber are secured to ensure a leak proof main processing chamber. The isolation valve 130 is open and the pumping system 140 is activated to create a vacuum inside the main processing chamber 100. A vacuum pressure gauge 120 is operable to measure and display the pressure value inside the main processing chamber 100. In one embodiment, the vacuum system includes the isolation valve 130, the pumping system 140, the pressure gauge 120 and a control system (not shown) to maintain the vacuum pressure within the main processing chamber 100 at a desired level. When the desired level of vacuum pressure is reached, e.g., $10^{-6}$ Torr, the incoming gas line 150 is enabled to initiate a semiconductor process, e.g., deposition. The completion of the semiconductor process, in one embodiment, signals the end of the manufacturing cycle for the machine. The isolation valve 130 is closed and the pumping system is turned off. The door to the load/lock chamber 110 is opened and the wafer inside the load/lock chamber 110 is retrieved for further processing.

Figure 2A:
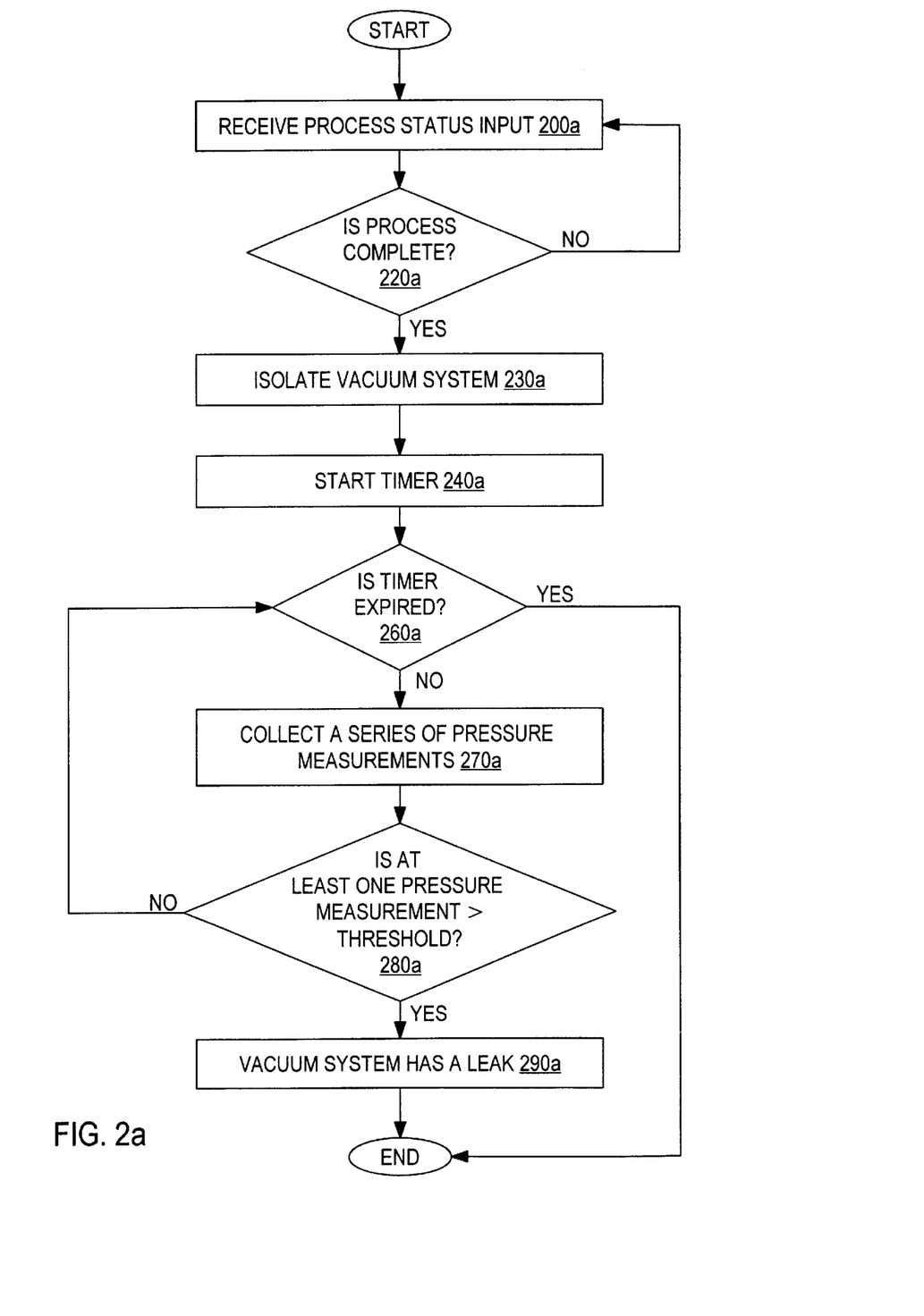
FIG. 2a is a flow chart illustrating a method for conducting a leak test for a vacuum system used in the manufacturing of semiconductor devices, according to an embodiment of the present invention.

FIG. 2a is one embodiment of a flow chart illustrating a method for conducting a leak test for a vacuum system used in the manufacturing of semiconductor devices.

In step 200a, an input representing the status of a process, e.g., complete or not-complete, is received. In one embodiment, the status of the process is represented as a binary digital signal, e.g., with a value 0 or 1. The status of the process may be derived from one or more inputs. For example, in one embodiment, the opening or closing of a door for the wafer load/lock chamber 110 is used to open or close a switch. The status of the switch may be used singly or in combination with other inputs, e.g., a pressure value input signal measured by the vacuum pressure gauge 120, to represent the status of the process.

In step 220a, a determination is made whether the manufacturing cycle or the process is complete. In one embodiment, the determination is made by simply reading the status of the process, e.g., complete or not-complete. In one embodiment, the determination that the process status is complete is reached when the door of the wafer load/lock chamber 110 is open and the pressure value input signal is above a pre-defined value. In one embodiment, the process status complete signal is converted to a digital output signal. If it is determined that the process status is not complete than the vacuum system continues to monitor the input values.

In step 230a, the vacuum system is isolated by sealing all inputs to and outputs from the main processing chamber 100. In one embodiment, the isolation is accomplished by closing the isolation valve 130. In one embodiment, the digital output signal obtained from the process status complete signal is used to close the isolation valve 130. The incoming process gas line 150 and the pumping system 140 are also shut off and isolated from the main processing chamber 100.

A timer is initiated in step 240a, in one embodiment. The value of the timer, e.g., 10 minutes, is typically adjustable or configurable to represent the duration of the leak test. In one embodiment, starting a timer includes starting a count down of the configurable timer value.

In step 260a, a determination is made whether the timer value is expired or not expired. If the count down has not been completed, i.e., the timer has not expired, then program control is transferred to step 270a. If the count down has been completed, i.e., the leak test is complete, then the process is complete.

In step 270a, a series of pressure measurements, e.g., by receiving a series of pressure value input signals measured by the vacuum pressure gauge 120, are collected. The particulars of the pressure measurements, e.g., the number of pressure measurements collected and the sampling frequency may be configurable. In one embodiment, each value in the series of pressure values collected may be recorded and stored.

In step 280a, a determination is made whether at least one pressure measurement of the series of pressure measurements exceeds a configurable threshold pressure. The threshold pressure is configurable based on the operating characteristics of a vacuum system. For example, if the normal operating pressure value is $10^{-6}$ Torr then the threshold pressure, in one embodiment, is set at $10^{-5}$ Torr. A main pressure chamber 100 with no leaks will maintain a pressure value below the threshold pressure. A pressure leak in the main pressure chamber 100 will increase the pressure values measured inside the main pressure chamber 100 to be substantially equal to the atmospheric over time.

If at least one pressure measurement of the series of pressure measurements exceeds the configurable threshold pressure it is concluded in step 280a that there is a leak in the main pressure chamber 100. The leak test is concluded when either the timer has expired or the main pressure chamber 100 is determined to have a leak.

Various steps of FIG. 2a may be added, omitted, combined, altered, or performed in different orders. For example, in one embodiment, step 230a may be split into additional steps, where the isolation of process chamber may include converting the process complete status to a digital output signal and closing an isolation valve using the digital output signal.

As described above, the method illustrated in FIG. 2a may be implemented by using a system which includes component based electronic circuits or by using a system which includes a processor enabled to execute program instructions, where the program instructions are stored in memory electronically coupled to the processor.

Figure 2B:
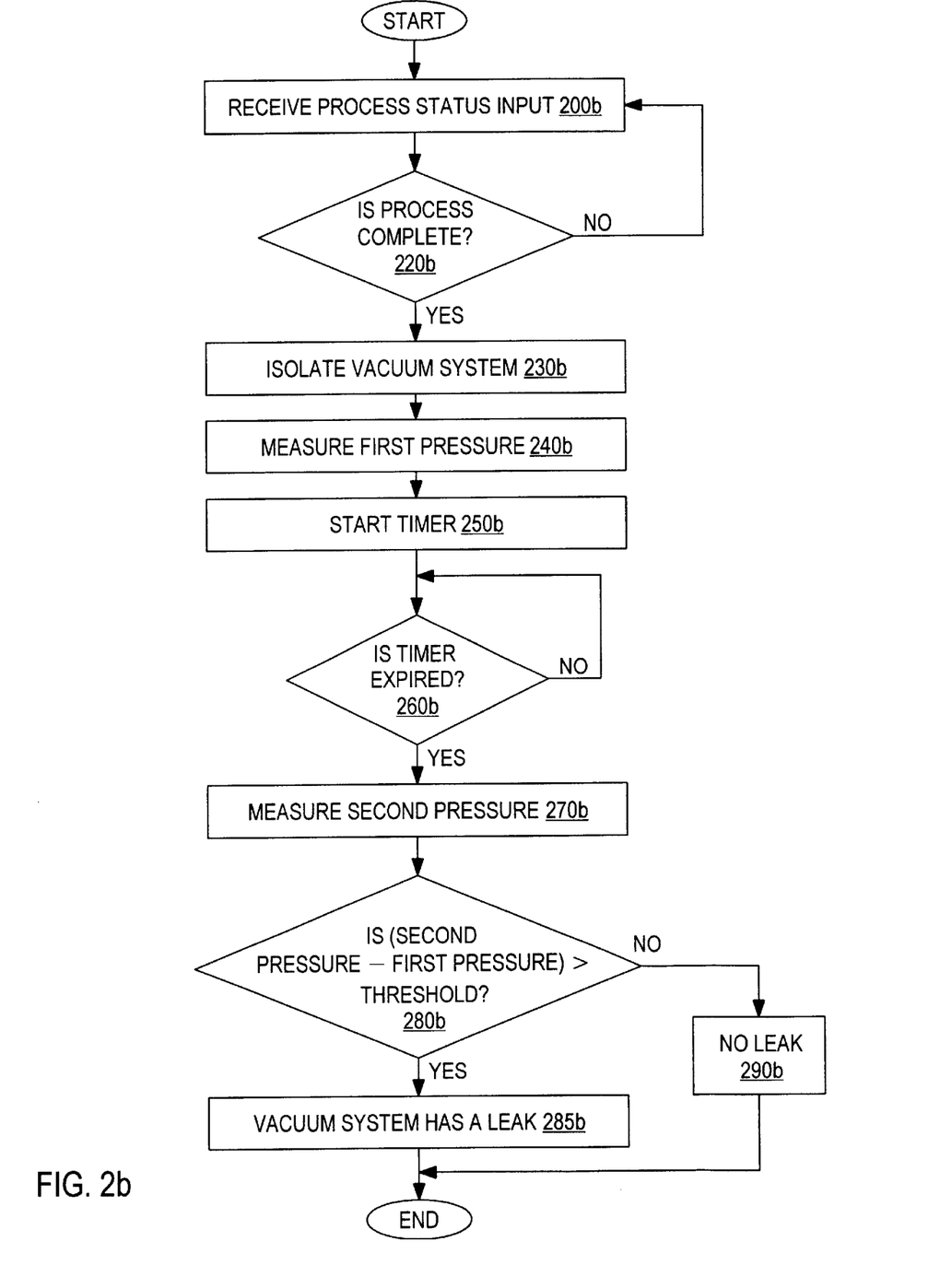
FIG. 2b is a flow chart illustrating a method for conducting a leak test for a vacuum system used in the manufacturing of semiconductor devices, according to another embodiment of the present invention.

FIG. 2b is one embodiment of a flow chart illustrating a method for conducting a leak test for a vacuum system used in the manufacturing of semiconductor devices.

In step 200b, an input representing the status of a process, e.g., complete or not-complete, is received. In one embodiment, the status of the process is represented as a binary digital signal, e.g., with a value 0 or 1. The status of the process may be derived from one or more inputs. For example, in one embodiment, the opening or closing of a door for the wafer load/lock chamber 110 is used to open or close a switch. The status of the switch may be used in combination with a pressure value input signal measured by the vacuum pressure gauge 120 to represent the status of the process.

In step 220b, a determination is made whether the manufacturing cycle or the process is complete. In one embodiment, the determination is made by simply reading the status of the process, e.g., complete or not-complete. In one embodiment, the determination that the process status is complete is reached when the door of the wafer load/lock chamber 110 is open and the pressure value input signal is above a pre-defined value. If it is determined that the process status is not complete than the vacuum system continues to monitor the input values.

In step 230b, the vacuum system is isolated by sealing all inputs to and outputs from the main processing chamber 100. In one embodiment, the isolation is accomplished by closing the isolation valve 130. The incoming process gas line 150 and the pumping system 140 are also shut off and isolated from the main processing chamber 100.

In step 240b, in one embodiment, a measurement of a first pressure is made in response to isolating the main pressure chamber 100. For example, a measurement is made by receiving a first pressure value input signal measured by the vacuum pressure gauge 120. The particulars of the pressure measurement, e.g., the sampling frequency may be configurable. In one embodiment, the first pressure value collected may be recorded and stored. In one embodiment, steps 230b and 240b may be performed in parallel.

A timer is initiated in step 250b, in one embodiment. The value of the timer, e.g., 10 minutes, is typically adjustable or configurable to represent the duration of the leak test. In one embodiment, starting a timer includes starting a count down of the configurable timer value.

In step 260b, a determination is made whether the timer value is expired or not expired. If the count down has not been completed, i.e., the timer has not expired, then the timer count down is allowed to continue. If the count down has been completed, i.e., the leak test is complete, then the program control is transferred to step 270b.

In step 270b, in one embodiment, a measurement of a second pressure is made in response to the expiration of the timer. For example, a measurement is made by receiving a second pressure value input signal measured by the vacuum pressure gauge 120. The particulars of the pressure measurement, e.g., the sampling frequency may be configurable. In one embodiment, the second pressure value collected may be recorded and stored.

In step 280b, a determination is made whether the second pressure exceeds the first pressure by at least a configurable threshold pressure. The threshold pressure is configurable based on the allowable leak characteristics of a vacuum system as a function of time. For example, if the normal operating pressure value is $10^{-6}$ Torr then the threshold pressure, in one embodiment, is set at 0.1 (normal operating pressure), i.e., $10^{-7}$ Torr. A main pressure chamber 100 with no leaks will maintain the second pressure and the first pressure, which are substantially equal to each other. A pressure leak in the main pressure chamber 100 will increase the second pressure value measured inside the main pressure chamber 100 to be greater than the first pressure by at least the threshold pressure.

If the second pressure measurement exceeds the first pressure by at least a configurable threshold pressure it is concluded in step 285b that there is a leak in the main pressure chamber 100. If the second pressure does not exceed the first pressure by more than the threshold pressure then it is concluded in step 290b that there is no leak in the main pressure chamber 100.

Various steps of FIG. 2b may be added, omitted, combined, altered, or performed in different orders. For example as described earlier, steps 230b and 240b may be executed in parallel.

As described above, the method illustrated in FIG. 2b may be implemented by using a system which includes component based electronic circuits or by using a system which includes a processor enabled to execute program instructions, where the program instructions are stored in memory electronically coupled to the processor.

Figure 3:
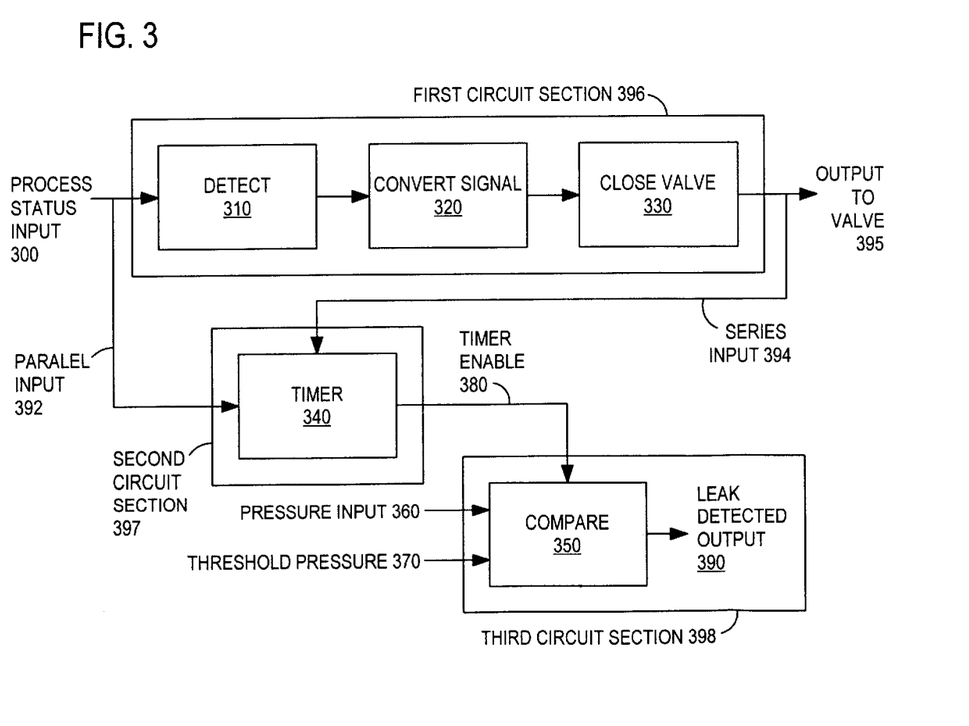
FIG. 3 is a functional block diagram for the system of FIGS. 2a and 2b, according to an embodiment.

FIG. 3 is one embodiment of a functional block diagram for the system of FIGS. 2a and 2b. In one embodiment, a detect function block 310 is configured to receive a process status input 300. As described in step 200a in FIG. 2a and step 200b in FIG. 2b, the process status input 300 is represented as a binary digital signal, e.g., with a value 0 or 1. In one embodiment, a process status with a value of 0 may represent a process not-complete state and a value 1 may represent the process complete state. The detect function block 310 is able to detect whether the process is complete or not-complete by determining the logical level of the process status. In one embodiment, the output of the detect function block 310 is passed on as an input to a convert signal block 320. In one embodiment, the convert signal block 320 is configurable to convert the signal level from a binary digital signal to a digital output signal with sufficient energy to command the isolation valve 130 to close. In one embodiment, a close valve 330 block is configurable to receive the digital output signal and generate an output to the valve 395 sufficient to energize a solenoid of the isolation valve 130 to close the valve. In one embodiment, the detect function block 310, the convert signal block 320 and the close valve 330 block are implemented by a first circuit section 396.

In one embodiment, the timer block 340 is configurable to receive the output to the valve 395 signal generated by the close valve 330 block. In this embodiment, the output to the valve 395 signal is described as a series input 394 signal. In another embodiment, the detect 310 block may generate a parallel input 392 signal to represent the process complete or process not-complete state. The timer block 340 is configurable to receive the trigger signal series input 394 or parallel input 392 and activate a timer function. In one embodiment, the timer block 340 is configurable to receive a time period and initiate a count down of the time period. In one embodiment, the time period represents the duration of the leak rate test, e.g., 10 minutes. In one embodiment, the timer block 340 is configurable to generate a timer enable 380 signal. The presence of the timer enable 380 signal indicates that an active countdown is in progress and the timer remains unexpired. In one embodiment, the timer block 340 is implemented by a second circuit section 397.

In one embodiment, the compare block 350 is configurable to receive a pressure input 360 signal representing the vacuum pressure inside the main processing chamber 100. The functionality of the compare block 350 is also described in step 280a of FIG. 2a and in step 280b of FIG. 2b. In one embodiment, the pressure input 360 signal is the output of the vacuum pressure gauge 120. The compare block 350 is also configurable to compare the values of two input signals, e.g., the pressure input 360 signal and a configurable value of a threshold pressure 370 signal. The compare block 350 is configurable to generate an output signal, if the pressure input 360 signal is greater than the threshold pressure 370 signal. The generation of the output signal, e.g., leak detected output 390, confirms the presence of a leak in the main processing chamber 100. In one embodiment, the compare block 350 output, e.g., leak detected output 390, is enabled by receiving the timer enable signal 380. The leak detected output 390 is disabled when the timer enable signal 380 is disabled. In one embodiment, the compare block 350 along with the leak detected output 390 is implemented by a third circuit section 398.

In one embodiment, each of the 3 circuit sections illustrated in FIG. 3, i.e., first circuit section 396, second circuit section 397 and third circuit section 398 may be implemented by using a variety of technologies such as single function chips electrically coupled to from a circuit, multi-function integrated circuits and microprocessors. In one embodiment, the implementation strategy uses component based electronic circuits to implement the methods described in FIGS. 2a and 2b. In one embodiment, a processor executes program instructions stored in memory to implement the system described in FIG. 3.

Figure 4A:
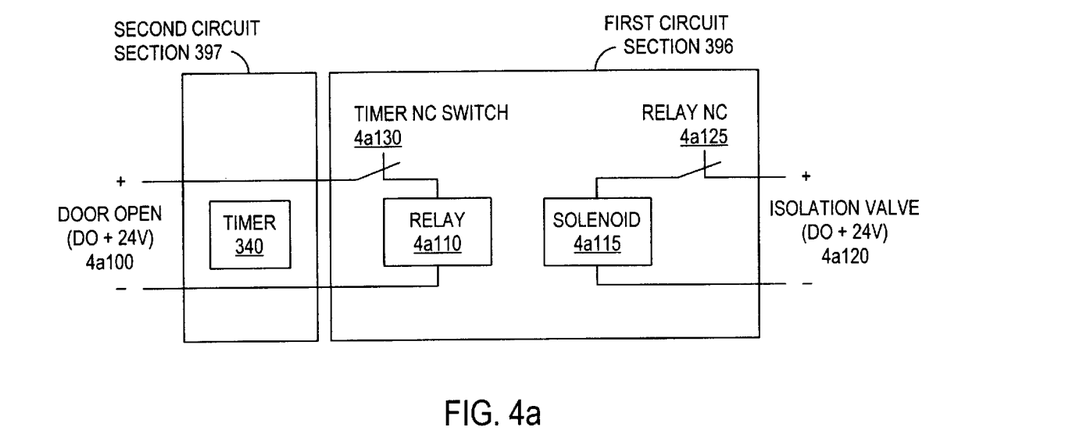
FIGS. 4a and 4b are schematic diagrams illustrating various aspects of electronic circuitry for the functional blocks of FIG. 5, according to an embodiment.
Figure 4B:
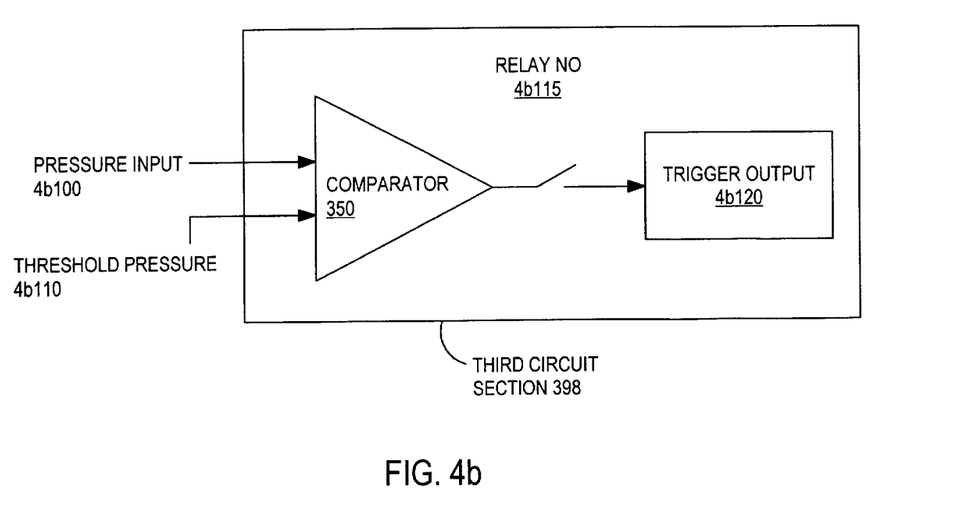

As discussed above, the system and method described herein may be implemented by using component based electronic circuits. Specifically, FIGS. 4a and 4b illustrate one embodiment of an exemplary schematic diagram to implement the first circuit section 396, second circuit section 397 and third circuit section 398. As illustrated in FIG. 3, the 3 circuit sections are arranged in the sequential order, or in one embodiment in parallel for the timer block 340, and are electrically coupled to each other such that the one or more outputs of one section are transferred to next in sequence section as one or more inputs.

Referring to FIG. 4a illustrating one embodiment of a schematic diagram to implement the detect block 310, the convert signal 320 block, close valve 330 block and the timer block 340, the process complete or process not-complete state of the process status input 300 is represented by door open signal 4a100. In one embodiment, when the door open signal 4a100 is activated then current flows through the timer block 340. In response, the Timer NC switch 4a130 is activated and current flows through the relay 4a110. The flowing of the current through the relay 4a110 pulls a solenoid 4a115 of the isolation valve 130, e.g., a foreline valve, and opens the normally closed NC relay 4a125. In one embodiment, the opening of the NC relay 4a125 results in closing the isolation valve 130. In one embodiment, the flowing of the current through the relay 4a110 also results in closing a NO relay 4b115 to enable the output signal 4b120, e.g., the leak detected output 390, of the comparator 350. The timer 340 is configurable to be set for a predefined value, e.g., 10 minutes, to represent the time duration of the leak test.

In one embodiment, on expiration of the timer 340, the timer NC 4a130 switch is opened. As a result there is no current flowing through the relay 4a110 and the relay is de-energized. In response, the solenoid 4a115 is no longer pulled and the NC relay 4a125 is closed. In one embodiment, the closing of the NC relay 4a125 results in opening the isolation valve 130. Also in response to the relay 4a110 being de-energized, the NO relay 4b115 is opened which results in disabling the output signal 4b120 of the comparator 350. In another embodiment, timer NC 4a130 switch may be operable to enable or disable the output signal 4b120 of the comparator 350.

Referring to FIG. 4b, the third circuit section 398 diagram illustrates one embodiment of a schematic diagram to implement the compare block 350, and the leak detected output 390 signal. The compare block 350 is configurable to receive and compare two inputs. The first input is the pressure input 360 signal, which represents the value of the vacuum pressure gauge 120 signal. In one embodiment, the pressure input signal is a 0–10 Volt signal, representing 0–1000 mTorr pressure measured inside the main processing chamber 100. The second input is a configurable trigger threshold pressure 370 of the vacuum system. In one embodiment, the trigger threshold pressure 370 input signal is set at 0.10 Volt, representing 10 mTorr pressure. The compare block 350 compares values of the two inputs and triggers an output signal 4b120 to activate the output when the pressure input 360 signal is greater than the configurable trigger threshold pressure 370 of the vacuum system. The main processing chamber is determined to be leaky when the output signal 4b120 is generated. As described in FIG. 4a, the NO relay 4b115 is closed, thereby enabling the output of the comparator 350, when the time 340 is still active, i.e., has not expired.

Figure 5:
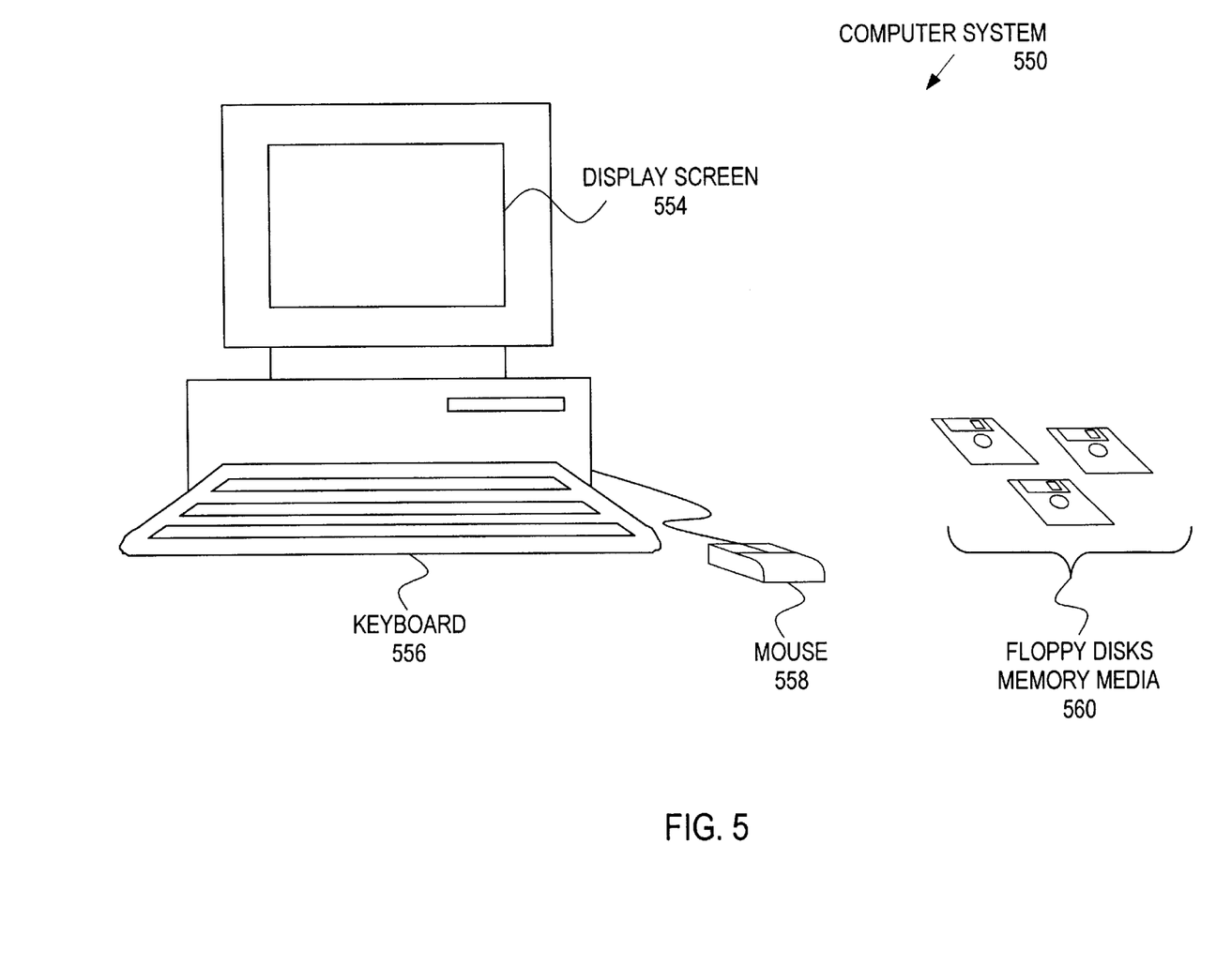
FIG. 5 is an exemplary computer system to implement method for conducting a leak test for a vacuum system, according to an embodiment of the present invention.
Detailed Description of the Preferred Embodiment

Referring to FIG. 5, a computer system 550 is shown which is useable to implement the method for detecting a malfunction of a slave power supply and triggering an interlock signal in response to the detection of the malfunction according to the present invention. The computer system 550 includes various standard components, including a display screen 554, a user input device, such as a mouse 558 or keyboard 556, memory (not shown), processor (not shown), DVD/CD-ROM (not shown), and a floppy disk drive (not shown). As used herein, the term "processor" generally describes the logic circuitry that responds to and processes the basic instructions that operate a computer system. The present invention preferably comprises a method executed by the computer system for conducting a leak test for a vacuum system used in the manufacturing of semiconductor devices.

The present invention also includes a memory media, included in the computer system, which stores software or program instructions which are executable by the computer to implement the above method. The memory media may be any of various types, including system memory, such as DRAM, SRAM, EDO RAM, RAMBUS RAM, etc., nonvolatile memory such as a hard disk or optical storage, and installation media such as a CD-ROM, DVD or floppy disks 560. The memory medium may include other types of memory as well, or combinations thereof.

The term "computer system" as used herein generally describes the hardware and software components that in combination allow the execution of computer programs. Computer programs may be implemented in software, hardware, or a combination of software and hardware. In one embodiment, one or more computer programs are configured for the function blocks 310, 320, 330, 340 and 350 as described in FIG. 3.

The computer system 550 may take various forms, including a personal computer system, mainframe computer system, workstation, Internet appliance, personal digital assistant (PDA), an embedded processor with memory or other similar device. In general, the term "computer system" may be broadly defined to encompass any device having a processor, which executes instructions from a memory medium.

The memory medium preferably stores software programs for detecting a malfunction of a slave power supply and triggering an interlock signal in response to the detection of the malfunction as described herein. The software program(s) are implemented in any of various ways, including procedure-based techniques, component-based techniques, and/or object-oriented techniques, among others. For example, the software program are typically implemented using XML, C++ objects, Java, Microsoft Foundation Classes (MFC), or other technologies or methodologies, as desired. A processor, such as the host CPU, executing code and data from the memory medium includes a means for creating and executing the software program or programs according to the methods and/or block diagrams described earlier.

The software of a computer system (e.g., computer system 550) typically includes at least one operating system. The operating system is typically available commercially or may be of a proprietary design. The operating system is a specialized software program that manages and provides services to other software programs on the computer system. Software may also include one or more programs to perform various tasks on the computer system and various forms of data to be used by the operating system or other programs on the computer system. A program is often copied into a volatile memory when running on the computer system 550. Data is read into volatile memory as required by a program.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for automatically conducting a leak test for a vacuum system, the method comprising the steps of:
   a) receiving an input to determine availability of the vacuum system for conducting the leak test;
   b) isolating the vacuum system in response to the vacuum system being available for conducting the leak test;
   c) measuring a first pressure of the isolated vacuum system;
   d) starting a timer representing a time duration of the leak test;
   e) measuring a second pressure of the isolated vacuum system at the expiration of the timer; and
   f) determining that the vacuum system has leaked when the second pressure exceeds the first pressure by at least a configurable threshold pressure.

2. The method of claim 1, wherein the vacuum system is operable to manufacture at least a certain portion of a semiconductor device.

3. The method of claim 2, wherein the manufacturing of the at least certain portion of the semiconductor device comprises a manufacturing process, wherein a cycle of the manufacturing process comprises a start phase and a completion phase.

4. The method of claim 3, wherein the completion phase occurs prior to receiving the input.

5. The method of claim 3, wherein steps a) through f) are repeated at an end of the completion phase of each cycle of the manufacturing process.

6. The method of claim 1, wherein isolating the vacuum system comprises closing an isolation valve.

7. The method of claim 1, wherein determining that the vacuum system has leaked results in activating a trigger signal to stop the manufacturing process.

8. A method for automatically conducting a leak test for a vacuum system, the method comprising the steps of:
   a) receiving an input to determine availability of the vacuum system for conducting the leak test;
   b) isolating the vacuum system in response to the vacuum system being available for conducting the leak test;
   c) starting a timer representing a time duration of the leak test;
   d) collecting a series of pressure measurements of the isolated vacuum system, wherein the series of pressure measurements are collected within the time duration of the leak test; and
   e) determining that the vacuum system has leaked when at least one pressure measurement of the series of pressure measurement exceeds a configurable threshold pressure.

9. The method of claim 8, wherein collecting the series of pressure measurements comprises receiving a plurality of electrical signals from a vacuum pressure gauge, wherein each of the plurality of electrical signals represents a pressure value measured inside a main processing chamber.

10. The method of claim 8, wherein each of the plurality of electrical signals are received consecutively and wherein each of the plurality of electrical signals is collected within a configurable time period.

11. The method of claim 8, wherein the vacuum system is operable to manufacture at least a certain portion of a semiconductor device.

12. The method of claim 11, wherein the manufacturing of the at least certain portion of the semiconductor device comprises a manufacturing process, wherein a cycle of the manufacturing process comprises a start phase and a completion phase.

13. The method of claim 12, wherein the completion phase occurs prior to receiving the input.

14. The method of claim 12, wherein steps a) through f) are repeated at an end of the completion phase of each cycle of the manufacturing process.

15. The method of claim 8, wherein isolating the vacuum system comprises closing an isolation valve.

16. The method of claim 8, wherein determining that the vacuum system has leaked results in activating a trigger signal to stop the manufacturing process.

17. An apparatus for automatically conducting a leak test for a vacuum system, the apparatus comprising:

a first circuit section electrically coupled to the vacuum system, wherein the first circuit section is configurable to receive a first input signal representing completion of a semiconductor manufacturing cycle, wherein the first circuit activates a first output signal to close an isolation valve coupled to the vacuum system in response to receiving the first input signal;

a second circuit section electrically coupled to the first circuit section, wherein the second circuit section activates a timer representing a time duration of the leak test in response to receiving the first output signal; and a third circuit section electrically coupled to the first circuit section and to the second circuit section, wherein the third circuit section comprises a comparator circuit and an output, wherein the comparator circuit is configurable to:

receive a second input signal representing pressure of the vacuum system, compare the second input signal to a configurable trigger pressure of the vacuum system; and trigger a second output signal to activate the output when the second input signal is greater than the configurable trigger pressure of the vacuum system.

18. The apparatus of claim 17, wherein the comparator circuit is configured to activate the output during the time duration of the leak test.

19. The apparatus of claim 17, wherein the second circuit section activates a timer representing a time duration of the leak test in response to receiving the first input signal.

20. The apparatus of claim 17, wherein the output is operable to stop the manufacturing process.

* * * * *